Sept. 17, 1929.  J. F. GOLDING  1,728,341
APPARATUS FOR MAKING WASHERS, NUT BLANKS, AND THE LIKE
Filed April 2, 1923  8 Sheets-Sheet 1
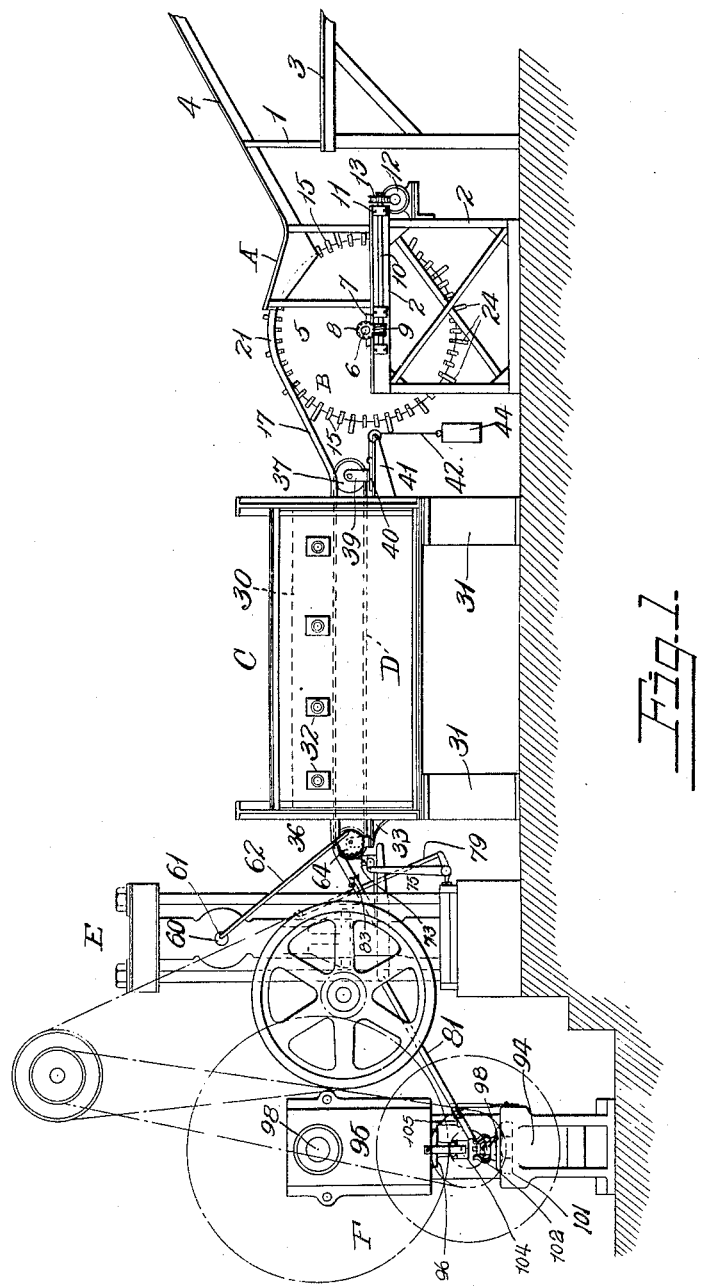
Inventor
JOHN F. GOLDING
By H. U. Low
Attorney

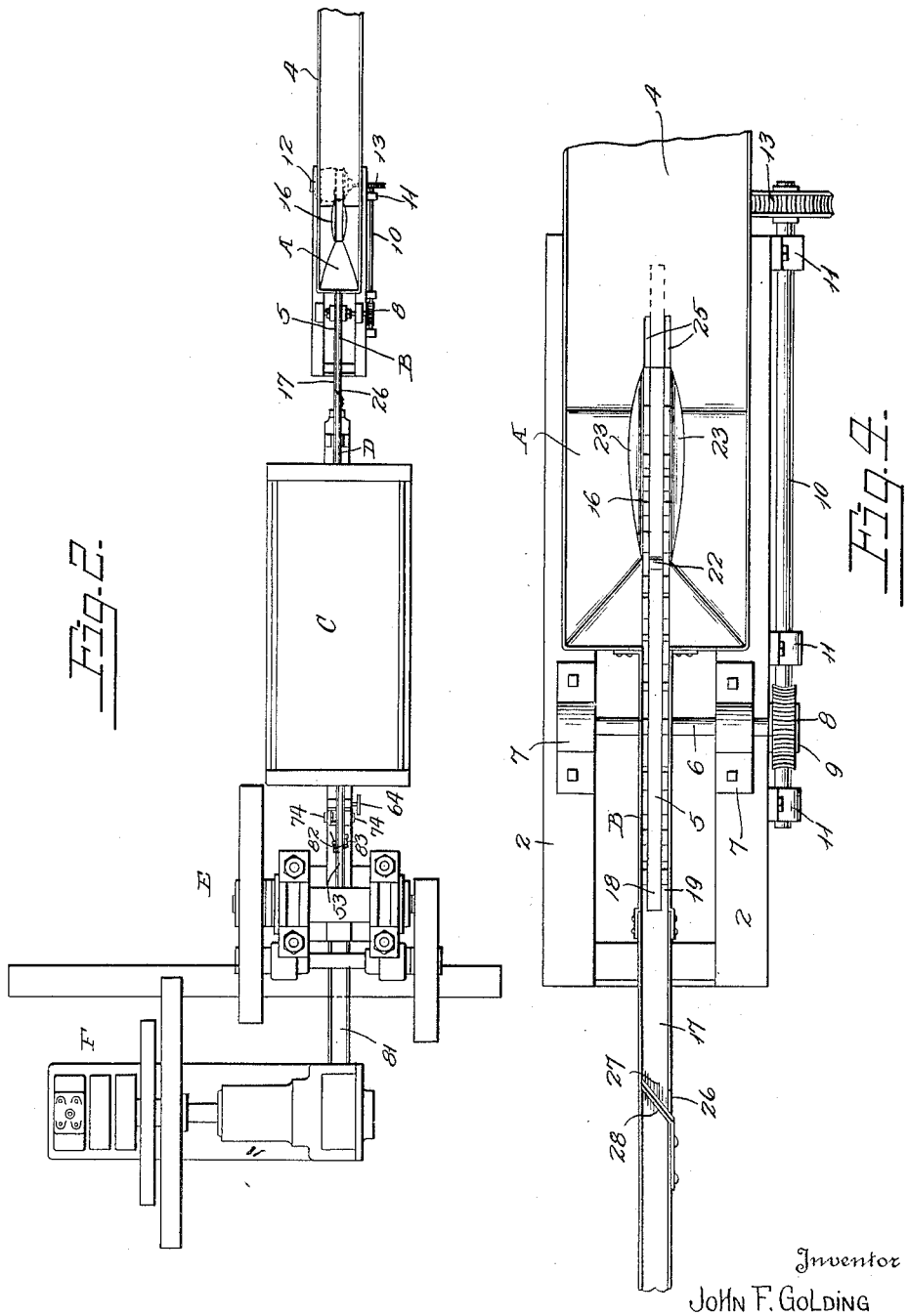

Sept. 17, 1929.  J. F. GOLDING  1,728,341
APPARATUS FOR MAKING WASHERS, NUT BLANKS, AND THE LIKE
Filed April 2, 1923  8 Sheets-Sheet 3
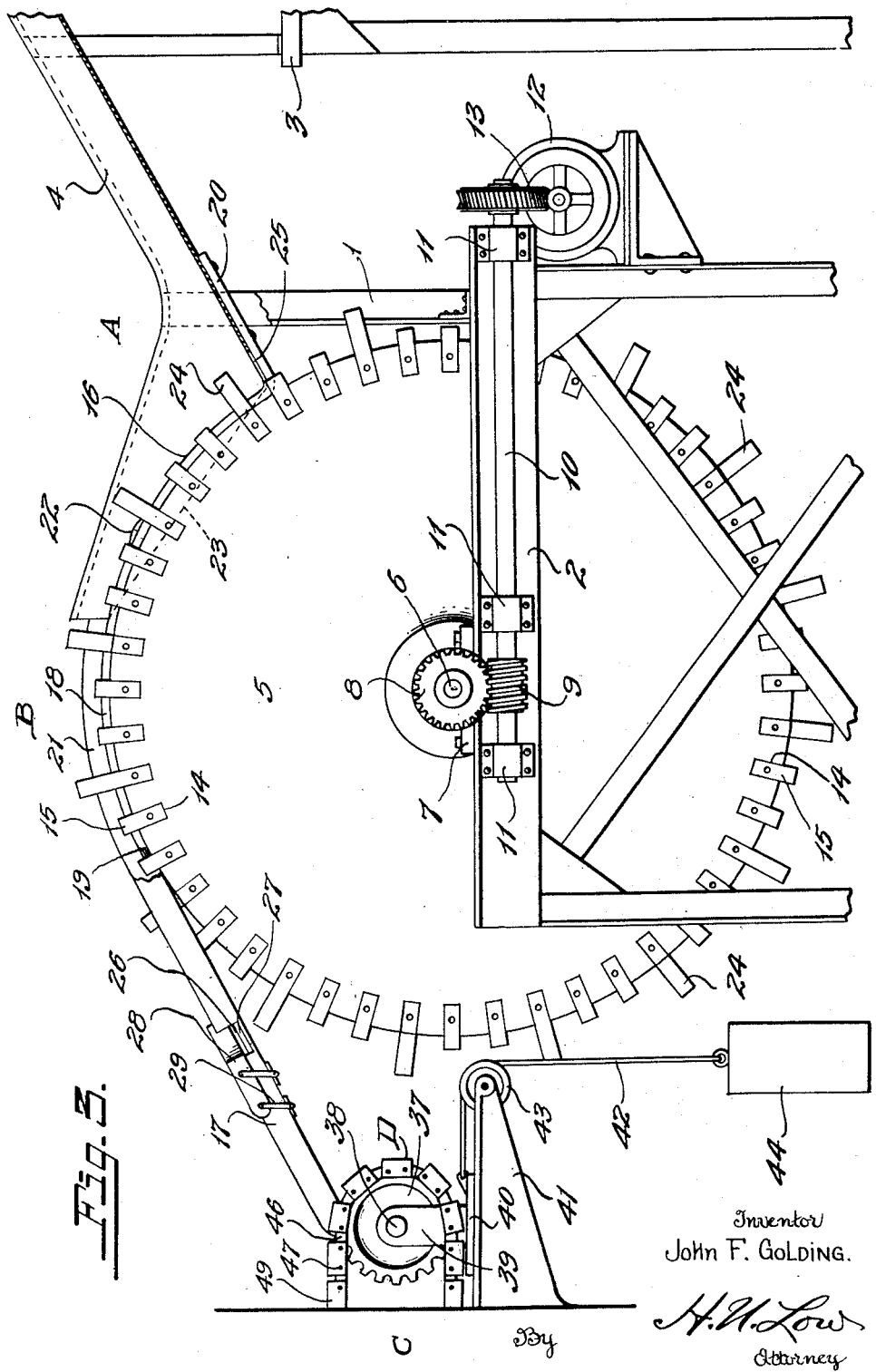
Inventor
John F. Golding.

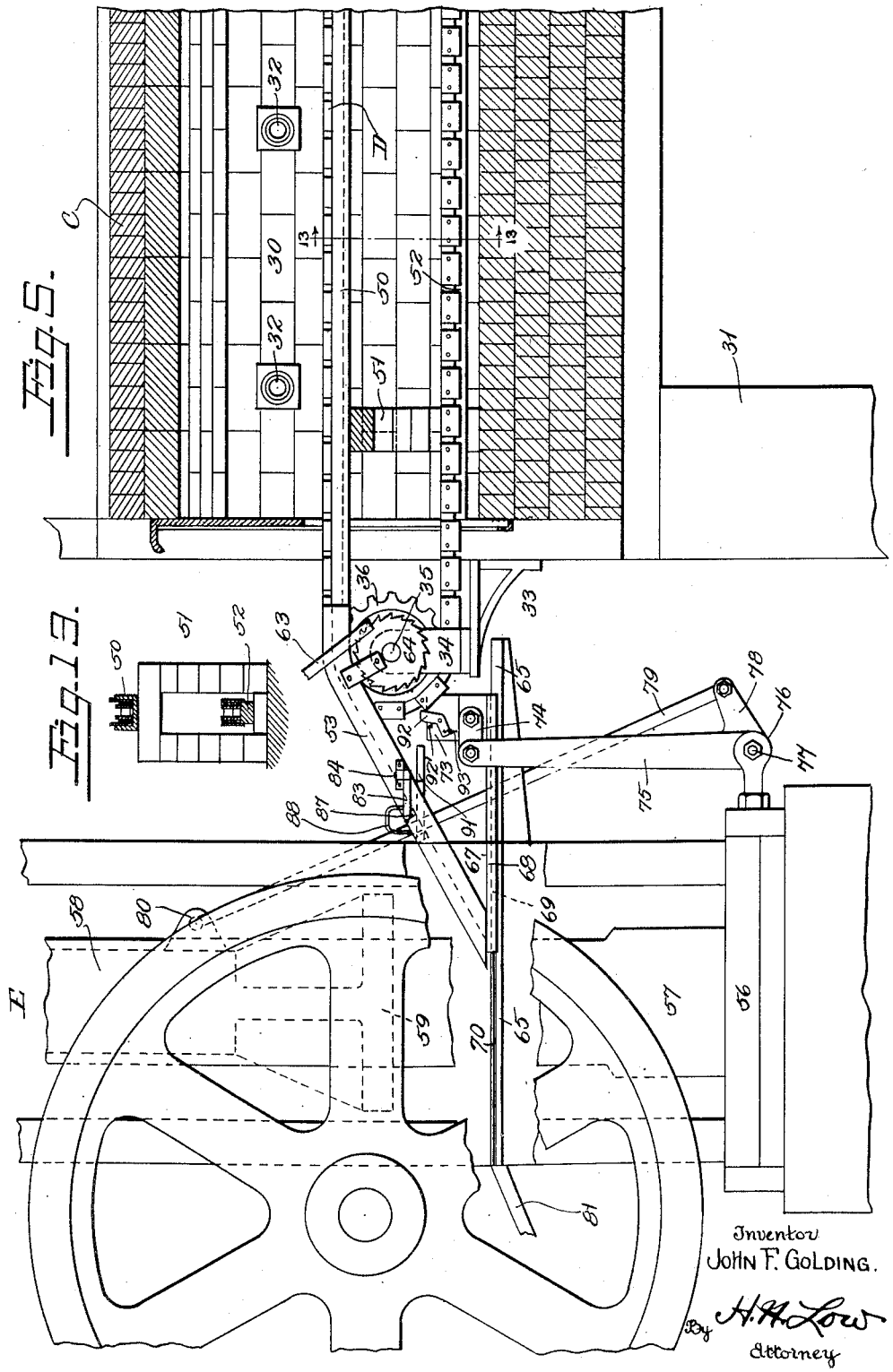

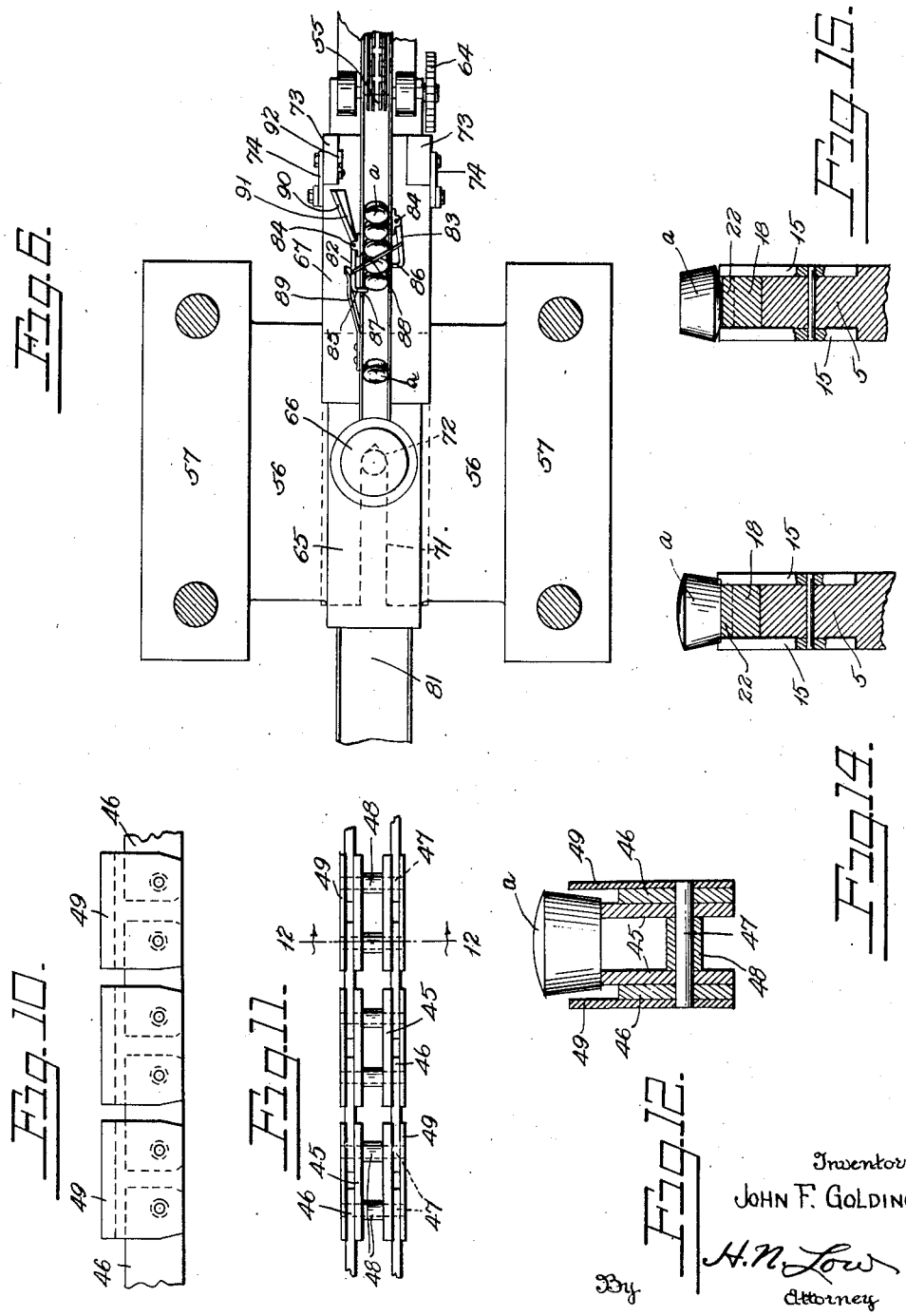

Sept. 17, 1929.  J. F. GOLDING  1,728,341
APPARATUS FOR MAKING WASHERS, NUT BLANKS, AND THE LIKE
Filed April 2, 1923  8 Sheets-Sheet 6
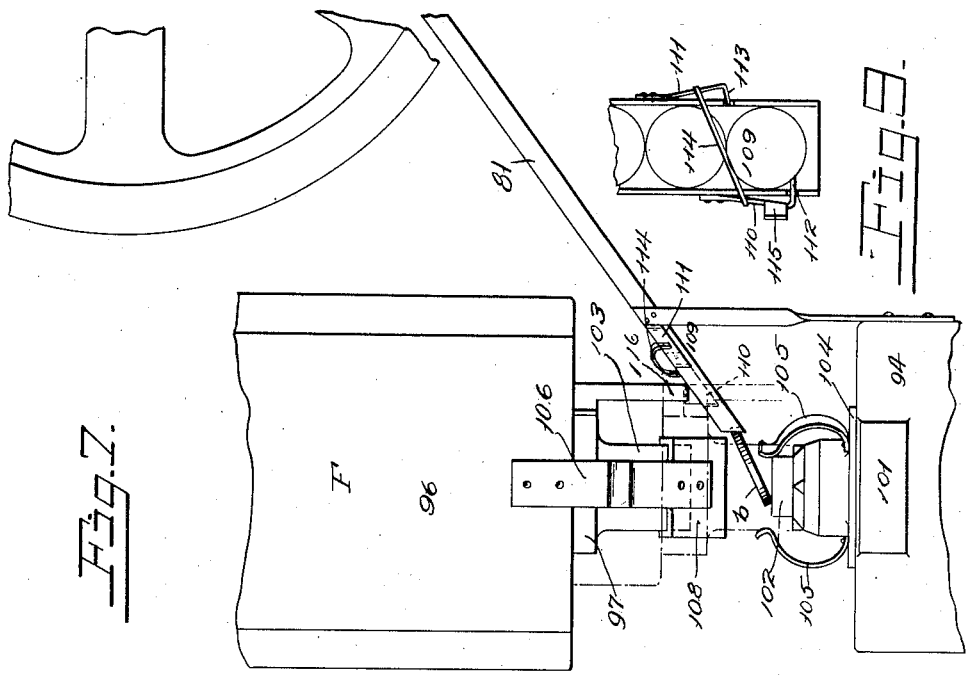
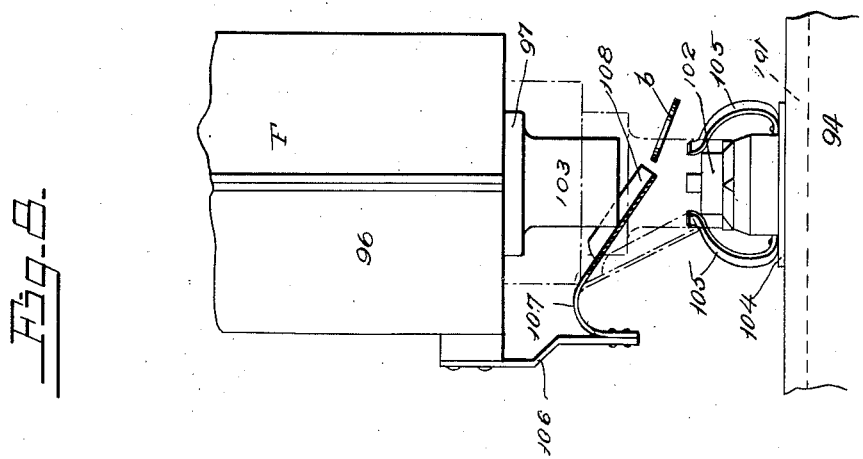
Inventor
JOHN F. GOLDING.
By  H. N. Low
Attorney Inventor
JOHN F. GOLDING.
By
H. M. Low
Attorneys.

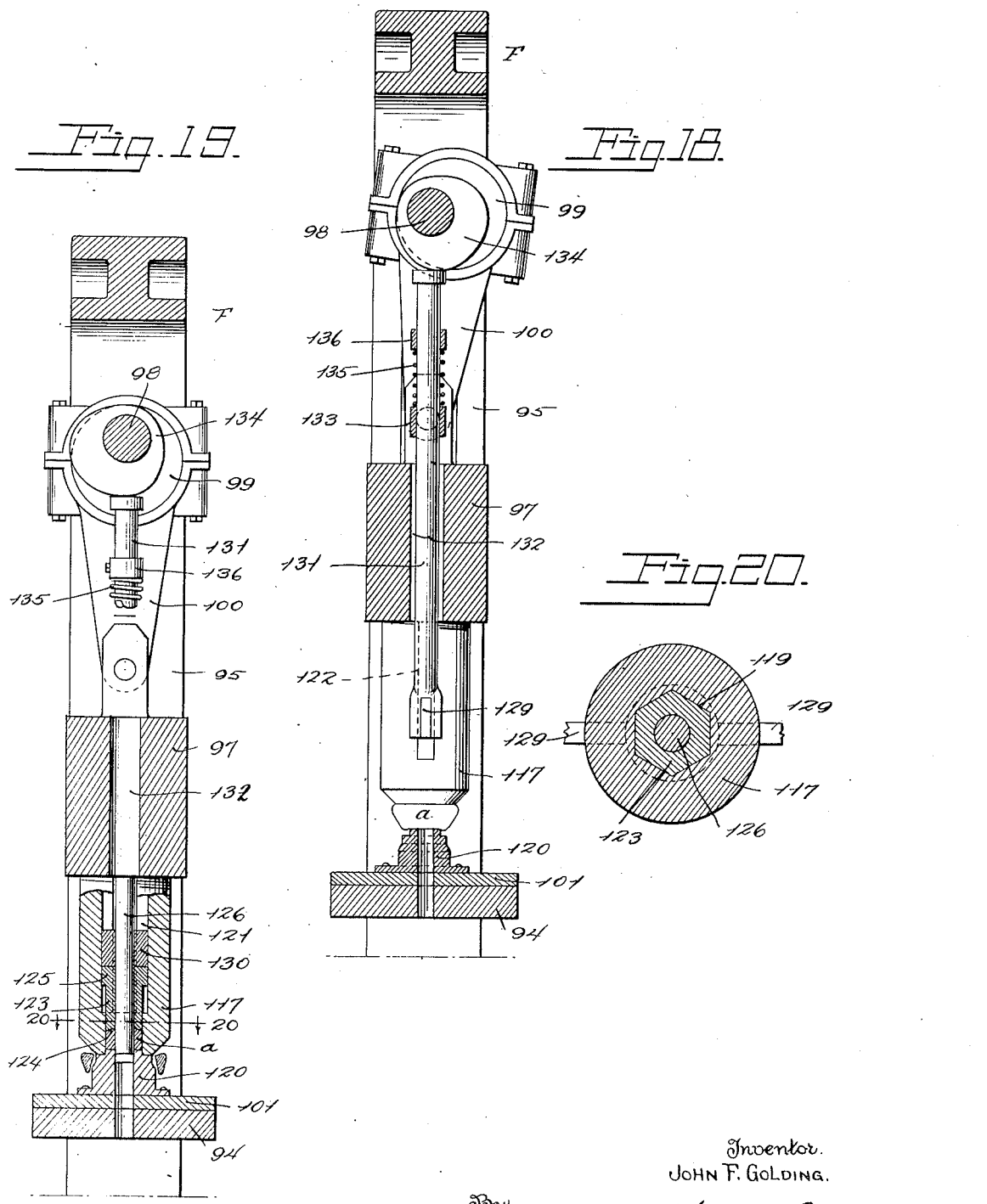

Patented Sept. 17, 1929

1,728,341

UNITED STATES PATENT OFFICE

JOHN F. GOLDING, OF PHILADELPHIA, PENNSYLVANIA, ASSIGNOR TO UNITED STATES NUT & WASHER COMPANY, OF DOVER, DELAWARE, A CORPORATION OF DELAWARE

APPARATUS FOR MAKING WASHERS, NUT BLANKS, AND THE LIKE

Application filed April 2, 1923. Serial No. 629,440.

The invention relates to metal working machines and it has particular relation to machines for producing washers, nut blanks and the like from slugs such as punchings derived from metal plates.

One of the objects of the invention is to provide a machine, of the character described, that will automatically deliver metal punchings from a bin or hopper to a heating furnace, and thence to a flattening or forming press which imparts to the hot punchings an initial or partial configuration and thence to a machine or press that will impart to the partially formed article its final configuration.

Another object of the invention is to provide a machine for making nut blanks from metal punchings and in which the natural convexed surface of such punching may be preserved and utilized for the purpose of providing a rounded or chamfered top to the finished nut blank. But such convexity of the top of the slug is not essential for I can sufficiently crown a nut blank made from a flattened slug.

Another object of the invention is to provide a machine, of the class designated, that automatically arranges the individual punchings in alinement and with the convexed side uppermost to be properly acted on by the forming machines and that will also leave behind such punchings or slugs that are not so positioned.

Another object of the invention is to provide selecting mechanism that will agitate the slugs contained in a feeding hopper simultaneously with removing the individual slugs therefrom.

A further object of the invention is to provide a novel conveyor chain construction, of heat resisting material such as nichrome, that will maintain the slugs in proper position, after having been delivered thereto, while being conveyed through a heating furnace and which will also hold the slugs in such position that practically their entire surface areas will be exposed to the heating action of the furnace.

A still further object of the invention is to provide a conveyor of the character described, that will permit the heated articles to be freely and accurately removed therefrom upon emerging from the furnace for the purpose of delivering them to the initial forming machine.

Another object of the invention is to provide means for automatically taking up the expansion of the conveyor chain when subjected to the heat of the furnace and for also supporting the flights of the chain between its supporting and driving sprocket wheels.

A still further object of the invention is to provide mechanism for controlling and regulating the passage of the heated metal slugs to the first forming press by interrupting their passage thereto in order that they may thereafter be permitted to proceed to said machine at spaced intervals and in timed relation with respect to the operation thereof.

Another object of the invention is to provide mechanism that will consecutively position such heat-treated slugs in properly centered position in the initial forming machine and that will simultaneously eject a preceding flattened or partially formed article from the machine.

Another object of the invention is to provide means for delivering the partially formed articles to the final forming machine in timed relation therewith and in properly centered position therein.

A still further object of the invention is to provide simple and effective means for discharging the finally formed articles from the last machine to a receptacle or suitably moving carrier.

With such objects in view, as well as other advantages which may be incident to the use of the improvements, the invention consists in the parts and combinations thereof and process hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Figure 1 is a side elevational view of a washer and nut-blank making machine constructed in accordance with the invention.

Fig. 2 is a top plan view of the structure illustrated in Fig. 1.

Fig. 3 is an enlarged view of the feeding and agitating wheel, the hopper from which it extracts the slugs being illustrated in vertical longitudinal section.

Fig. 4 is a plan view of the structure shown in Fig. 3 and illustrating the contour of the bottom portion of the hopper which prevents the slugs which are expelled from the feeding wheel from displacing the slugs which are properly positioned thereon.

Fig. 5 is a view partially in side elevation and partially in vertical longitudinal section, illustrating the mechanism for delivering the heated slugs to the initial forming press from the furnace.

Fig. 6 is a horizontal sectional view through the initial forming press and illustrating the feeding mechanism in plan view.

Fig. 7 is an enlarged front elevational view of a portion of the finishing press and illustrating the mechanism for feeding the flattened slugs to the punching and trimming dies and centering them with respect thereto.

Fig. 8 is a side elevational view of the structure illustrated in Fig. 7 and showing more clearly the means for ejecting a finished washer from the press.

Fig. 9 is a plan view of the device for controlling the delivery of the flattened punchings to the finishing press.

Fig. 10 is a side elevational view of a portion of the conveyor chain which conveys the slugs through the heating furnace.

Fig. 11 is a plan view of the structure illustrated in Fig. 10.

Fig. 12 is a vertical transverse sectional view on a larger scale taken on line 12—12 of Fig. 11.

Fig. 13 is a vertical transverse sectional view taken on line 13—13 of Fig. 5, and illustrating the supports and guides therefor.

Fig. 14 is a vertical transverse sectional view on a larger scale and illustrating a properly positioned punching being conveyed over the means which dislodges said punchings as may be improperly positioned.

Fig. 15 is a view similar to Fig. 14 but illustrating the manner in which an improperly positioned slug is forced radially out of engagement with the fingers of the conveying wheel.

Fig. 18 is a vertical sectional view taken on line 18—18 of Fig. 16, and illustrating the upper die element in side elevation.

Fig. 19 is a view similar to Fig. 18 but illustrating the upper die element in vertical section.

Fig. 20 is an enlarged horizontal sectional view taken on line 20—20 of Fig. 19.

Figure 16:
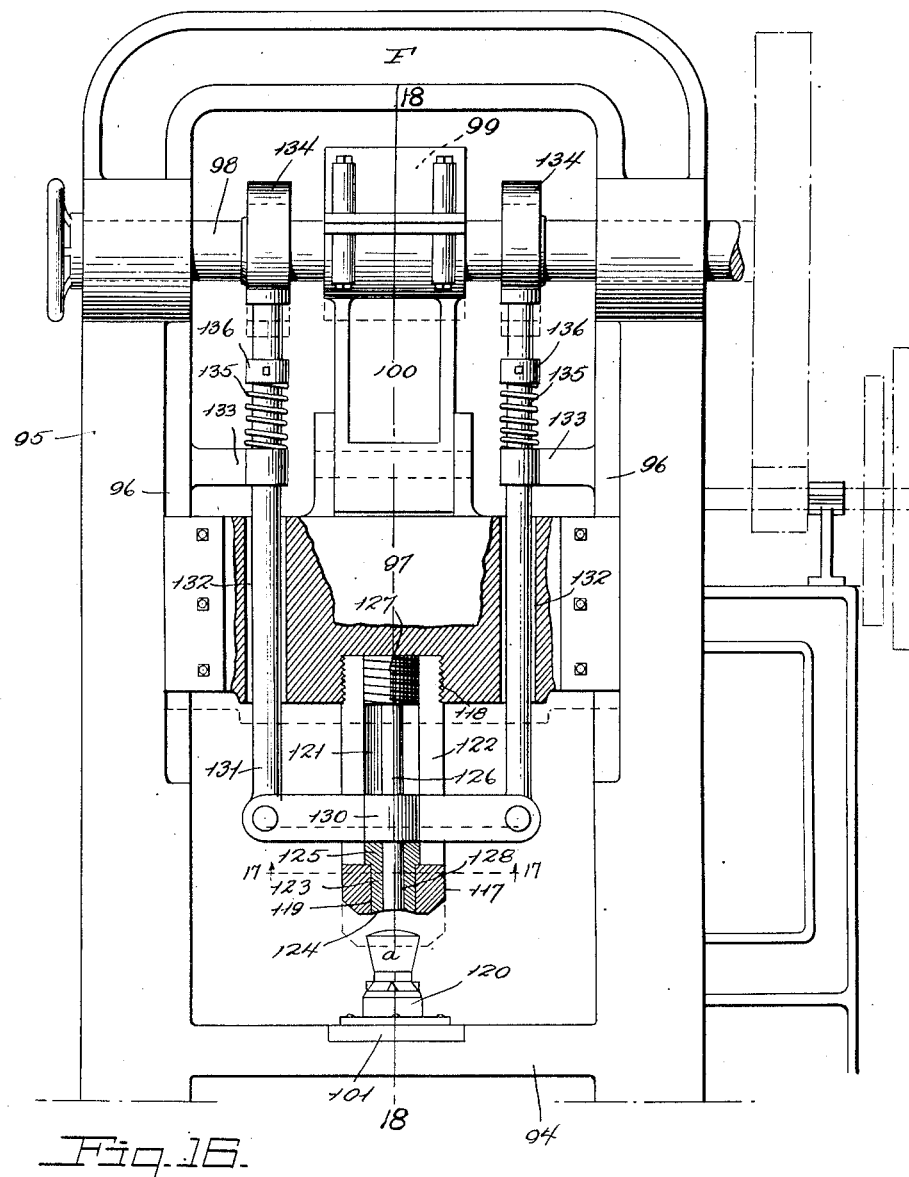
Fig. 16 is a front elevational view of a finishing press equipped with dies for forming nut blanks from metal punchings.

Referring to the drawings, there is illustrated a machine for producing metal washers and nut blanks from punchings and which, in general, comprises a hopper A, conveying and positioning elements B, a furnace C, a conveyor D for conveying the slugs or punchings through the furnace, an initial or slug-flattening press E, and a final or finishing press F.

The hopper A is carried by a framework 1 which is in turn supported by a suitable frame 2 located at the receiving end of the machine. The punchings a or slugs may be delivered directly to the hopper A from a loading platform 3 or from a chute 4 which leads to a suitable bin or storage receptacle (not shown) located at a more remote point.

The conveyor elements B comprise a rotatable conveyor in the form of a substantially disk-like wheel 5 which is provided with a shaft 6 that is journaled in bearings 7 carried by the frame 2. The coveyor 5 is continuously rotated at a comparatively low speed (six R. P. M.) by means of a worm wheel 8, which is fixed to the shaft 6, and an inter-meshing worm 9, which is carried by a shaft 10. The shaft 10 is mounted in bearings 11 which are carried by the frame 2 and is driven by an electric motor 12 through the medium of suitable reduction gearing 13. The wheel 5 is preferably formed of a single casting both sides of which, adjacent to its periphery, are provided with a plurality of radially extending grooves or recesses 14 in each of which is bolted a finger 15. These fingers extend radially beyond the outer periphery of the wheel 5 a sufficient distance to project through a slot 16 formed in the bottom portion of the hopper A and to engage and individually extract the punchings from the hopper for delivery to a chute 17 which acts as a supply magazine for the conveyor D.

The space between the upper end of the chute 17 and the delivery end of the hopper A is bridged by means of a convex bar 18 (Figs. 3 and 4) a portion of which is of the same radius of curvature as the wheel 5. This bar is disposed between the fingers 15 of the wheel 5 and is suitably secured to the forward end of the chute 17 as at 19. The rear portion of the bar 18 curves over the wheel 5 and downwardly entirely through the slot 16 in the hopper and hence upwardly, as at 20, and is fixed to the hopper A to provide a support for its rear end. Side plates or guides 21 are fixed at their respective ends to the hopper A and to the chute 17 and not only serve as a support for the chute but prevent the lateral displacement of the slugs as they pass along the bar 18.

By reason of the fact that metal punchings from plates or bars or from large nuts generally have a convex upper surface and a relatively flat lower surface there is a tendency for them to be unsteady and to be easily displaced if they are conveyed through the machine while resting on their convex surfaces, but, if they are supported on their flat sides they are very steady and slide down the several chutes without becoming displaced. For example, if a slug commences to gravitate through the chute 17 while resting on its convex side there is a tendency for the slug to rock to a position on its edge and to roll down the chute displacing any slugs that may be in its path. It will therefore be apparent that it is necessary that the slugs be properly positioned before they are delivered to the chute 17 and in order, therefore, to insure that the slugs are thus properly positioned with their flat sides downward, the bar 18 is provided with an elevated portion 22 (Figs. 3, 4, 14 and 15) within and adjacent to the exit end of the hopper A. This elevated portion 22 is formed with a curved and convex upper surface, the highest point of which is slightly below the upper extremity of the fingers 15. If a punching is engaged by the fingers 15 of the wheel 5 and commences to be advanced along the bar 18 to the chute 17 in an inverted position, that is to say with the convex surface downward (Fig. 15), it will first engage the elevated portion 22 and be carried upwardly upon it. Due to the curvature of the convex surface of the slug and to the fact that the fingers 15 engage it at nearly diametrically opposed points, the slug will be moved radially by the curvature of the part 22, out of engagement with the fingers 15 as it approaches the highest point of the elevation 22 (Fig. 15). As soon as the slug is thus released by the fingers 15 it will gravitate back into the hopper A. If, on the other hand, the fingers 15 pick up a slug with the flat side downward and the convex side upward, the fingers 15 of the wheel 5 will remain in engagement therewith (Fig. 14) and carry it over the elevation 22, out of the hopper A and to the chute 17. The result is that only the slugs right side up or resting on their flat bottoms are removed from the hopper for the further feeding, forming and cutting operations.

As the improperly positioned slugs are dislodged from the fingers 15 of the conveyor wheel 5, as above described, and gravitate back to the hopper A, there may be a tendency for them to contact with and to dislodge the properly positioned slugs following in their rear. To avoid this difficulty the edges of the bottom of the hopper adjacent to the slot 16 are inclined downwardly and away from the portion of the periphery of the conveyor wheel 5 that projects into the hopper, as indicated at 23 (Fig. 4). These inclined surfaces 23 gradually merge with the sides and bottom of the hopper near the lowest portion thereof. By this construction the slugs, as they are dislodged from the wheel 5, fall or slide laterally away from the wheel and traverse a substantially curved path around the slugs positioned on the wheel to the collection of slugs contained in the bottom of the hopper without engaging the slugs that have been subsequently picked up by the fingers 15 of the wheel 5, to a position in which they may be again, in turn, extracted therefrom.

At spaced intervals about the periphery of the wheel 5 the fingers 15 are replaced by relatively long agitating fingers 24 which enter the hopper A through the slots 25 formed in the bottom portion thereof and are adapted to intermittently agitate the mass of slugs contained therein to facilitate the wheel 5 in picking them up and positioning them on the bar 18. The fingers 24 which are disposed on one side of the wheel 5 are preferably staggered with respect to those located on the other side so as to alternately agitate the slugs in the hopper A in opposite lateral directions as they successively pass into the hopper through the slots 25.

As the slugs pass from the feeding wheel 5 they gravitate down the chute or magazine 17 to the conveyor chain D and as they are delivered to this chute at a faster rate than they are picked up by the chain D they bank up in the chute 17 and provide a gravitational head, which force insures that the lowermost slug is positively and accurately fed to and positioned on the chain D. In order that the force exerted by this gravitational head be maintained constant and to insure that the slugs will not bank up on the bridging bar 18 and jam the machine, an opening 26 is provided in the side wall of the chute 17 adjacent to the upper portion thereof through which the surplus quantity of slugs fed to the chute 17 may escape therefrom. The upper edge of the uppermost slug in the stack which is banked up in the chute 17 is disposed substantially at the lower portion of the opening 26 and as the surplus slugs engage therewith they are deflected laterally through this opening. The bottom of the chute 17 adjacent to the opening 26 may be inclined slightly towards this opening as at 27 to further assist the slugs to escape through the opening after engaging the uppermost slug in the chute 17.

It may transpire that a slug be so dislodged on the bar 18 that it rolls down towards the chute 17 on edge. If such a slug is permitted to enter the chute 17 it will roll down over the banked up slugs therein and possibly dislodge one or more of them with the result that they are either improperly positioned upon the conveyor chain D located at the bottom of the chute 17 or entirely avoid the chain D. In order, therefore, to avoid this possibility, a gate 28 is provided for regulating or entirely closing the upper end of the chute 17. This gate is preferably disposed at an acute angle to the direction of travel of the slugs along the bar 18 and the chute 17 and is suitably mounted to move vertically with respect to the bottom of the chute 17. Such a movement may be effected by means of the parallel link connections illustrated in the drawings at 29 or by a suitable sliding connection. During the operation of the machine the gate 28 is opened a sufficient distance to permit a slug that is disposed in a position flat upon the bar 18, to pass freely under the gate, but, if a slug should roll down the bar 18 to the chute upon its edge, as above described, its increased height will prevent its passage under the gate 28 and it will be consequently deflected laterally through the opening 26. If anything should jam in the machine or if the operation of the conveyor D be temporarily stopped without discontinuing the operation of the feeding wheel 5, the gate 28 may be entirely closed and in such event all of the slugs passing down the bar 18 will be deflected through the opening 26.

The furnace C is, or may be, of usual or standard construction and comprises, in general, an elongated longitudinal heating chamber 30 which is mounted upon pillars or pedestals 31 and which is provided with openings at each end through which the conveyor chain D may freely pass. Heat for the furnace is derived from a plurality of burners 32 which are disposed in the side walls of the furnace and which direct flames into the chamber 30 transversely to the direction of movement of the chain D therethrough. A plurality of brackets 33 are provided at the forward end of the furnace C and carry a plurality of bearing elements 34 within which a transversely extending shaft 35 is rotatably mounted.

A sprocket wheel 36 is fixed to the shaft 35 at a point intermediate its extremities and supports the forward end of the conveyor chain D. The rear end of the conveyor chain D is supported by means of a similar sprocket wheel 37 which is mounted on a shaft 38. The shaft 38 is journaled in bearings 39 which are in turn carried by a common base 40. The base 40 is mounted for longitudinal slidable movement upon a suitable bracket 41 which projects over the rear end of the furnace structure. A cable 42 is secured to the base 40 and passes rearwardly over a sheave or pulley 43 which is mounted at the extremity of the bracket 41 and is provided at its other end with a depending weight 44 (Fig. 3). This weight exerts a tension upon the sliding base 40 and all of the elements carried thereby and effectually takes up all of the slack that may develop through the expansion of the chain D when subjected to the heat of the furnace during its passage therethrough.

The chain D is constructed entirely of a heat resisting metal such as, for example, nichrome which has the peculiar property of maintaining its tensile strength and resisting oxidation under very high temperatures. This chain consists of a plurality of inner and outer links 45 and 46 respectively (Figs. 10, 11 and 12) which are connected together by means of transversely extending pins 47. The inner links 45 are of a greater height than the outer links 46 and are spaced apart by means of sleeves 48 which are carried by the pins 47, and between which the teeth of the sprocket wheels 36 and 37 project. A relatively high plate 49 is carried by the pins 47 and contiguous to the outer side of each of the outer links 46. These plates are of a greater height than the inner links 45 and together constitute continuous articulated side walls or flanges which prevent the slugs from becoming laterally displaced from the chain D. By means of this particular construction the chain D constitutes a continuous flexible metallic channel which is adapted to convey the slugs through the furnace while resting on their flat bottom faces and to maintain the slugs in properly spaced position therein. In addition to a feature to be hereinafter described, the difference between the height of the inner links 45 and that of the outer links 46 is such that the slugs only engage and are supported by the inner links and as a result the heated air and products of combustion within the furnace may freely circulate around the slugs and contact with practically their entire surface areas.

The upper stretch of the chain D is supported in a suitable channel or guide member 50 (Fig. 13) which is supported by pedestals 51 preferably constructed of fire brick and disposed at spaced intervals longitudinally of the heating chamber 30. This support prevents the chain D from sagging between the sprocket wheels 36 and 37 and maintains the slugs carried thereby in a substantially rectilinear path while passing through the furnace. The lower stretch of the chain D is also supported by means of a rod or bar 52 which is supported adjacent to the bottom portion of floor of the furnace chamber and disposed between the side plates 49 of the chain. While the lower stretch of the chain D returns through the furnace the high links 45 directly engage and slide upon the bar 52 and the side plates 49 prevent their lateral displacement therefrom.

A chute 53 is disposed in alinement with the chain D at the delivery end thereof and is secured at its upper end to the bearings 34 of the sprocket wheel 36. The lower extremity of this chute is supported and maintained in a rigid position by means of suitable attachment to the frame of the forming press E. The upper end of the bottom portion of the chute 53 is provided with a plurality of fingers 55 (Fig. 6) and intermediate slots through which the chain links pass down. The slugs as they approach the end of the conveyor chain D during their course of travel through the oven C, engage these fingers as the chain descends over the sprocket wheel 36 and rest thereon. From this position the slugs gravitate down the chute 53 until they are arrested by a control and timing device presently to be described.

The initial forming machine E is, in the present instance, shown as consisting of a flattening press to which the heated slugs are delivered over the chute 53 and which is adapted to press them to the desired thickness (approximately that of the blank desired) prior to conveying them to the finishing machine. The press E comprises in general a base portion 56 and a frame 57 which carries a plurality of guides 58 and a vertically reciprocating plunger or ram 59. The plunger 59 is actuated by the cam shaft 60 which is mounted in the upper portion of the frame 57. One end of the shaft 60 is provided with an eccentrically disposed pin 61 to which one end of a rod 62 is pivotally connected. The rod 62 extends downwardly and is provided at its lower end with a toothed or rack portion 63 which engages a ratchet wheel 64 that is fixed to one end of the sprocket wheel shaft 35. The eccentricity of the pin 61 is such that upon every revolution of the crank shaft 60 the rod 62 will be reciprocated and the rigid wheel 64, shaft 35 and sprocket wheel 36 will be partially rotated. This intermittent and partial rotation of the sprocket wheel 36 causes an intermittent motion to be imparted to the conveyor chain D in timed relation with respect to the reciprocation of the plunger 59 of the flattening press E.

A bed plate 65 is fixed to the base portion 56 of the press E and extends rearwardly toward the furnace C. The bed plate is recessed directly below the plunger 59 to receive a lower die plate 66 (Fig. 6), the upper surface of which is flush with the surface of the bed plate. A feed plate 67 is slidably mounted on the bed plate 66 and is provided with depending side flanges 68 having inturned lower edges 69 (Fig. 5) which slidably engage longitudinally extending grooves 70 provided in the sides of the plate 65. The feed plate 67 is further provided with a centrally disposed longitudinally extending slot 71 (Fig. 6) which terminates in a substantially V-shaped end portion 72. The feed plate 67 extends rearwardly along the bed plate 65 and is provided with a plurality of bearing blocks 73 to the outer sides of which forwardly extending links 74 are pivotally connected. The forward ends of the links 74 are pivotally connected to upwardly extending arms 75 of a bell crank lever 76 which is pivotally mounted upon the base 56 of the press E at 77. The other arm 78 of the bell crank lever 76 extends rearwardly and is pivotally connected to a link or rod 79 which extends upwardly and is pivotally connected to the reciprocating plunger 59 of the press E at 80.

By means of this link and lever mechanism the feed plate 67 is reciprocated upon the bed plate with every reciprocation of the plunger 59. When the feed plate is in its extreme rearward position the slot 71 therein will be directly under the lower end of the chute 53 and in position to receive a heated slug therefrom and the forward end of the feed plate in a position in which it is without the path of the plunger 59. When the feed plate occupies the position described the plunger 59 is in its extreme lowermost position. As the plunger 59 rises the feed plate 67 will simultaneously slide forwardly and advance a heated slug to a properly centered position upon the die plate 66 and beneath the die carried by the plunger 59. As the plunger 59 descends the feed plate 67 will be automatically withdrawn and out of engagement with the positioned slug. When the die carried by the plunger 59 engages a slug the same will be flattened to a predetermined and desired thickness. As the plunger again rises the feed plate will again advance with another slug and the forward portion thereof will remove the flattened slug $b$ from its position beneath the plunger by reason of the fact that the flattening operation increases the diameter of the slug to such an extent that it is greater than the width of the slot 71. As the flattened slug $b$ is removed from the press by the action of feed plate it passes into a chute 81, constituting a magazine for the press, and gravitates to the second operation or finishing machine F.

It will be apparent from the foregoing that the feed plate 67 performs three distinct functions. It feeds the heated slug to a position upon the die plate 66, it centers the slug properly with respect to the die carried by the plunger 59 and it removes the flattened slug from the machine.

In order that a single slug only shall be fed into the slot 71 of the feed plate 67 upon every reciprocation of the feed plate and plunger 59, a pair of levers 82 and 83 (Fig. 6) are pivotally mounted for lateral movement on each side of the chute 53 as at 84. The forward ends of the levers 82 and 83 are respectively provided with relatively wide flat inwardly extending fingers 85 and 86 which are disposed in alinement with slots 87 provided in the side flanges of the chute 53 and in staggered relation with respect to each other. The levers 82 and 83 are yieldably connected to move in unison by means of a resilient yoke member 88. A spring 89 tends to maintain the lever 82 in an inward position with the finger 85 thereof extending through its opening 87 in the side wall of the chute and in the path of the slugs as they pass therealong. The lever 83 is consequently maintained in its outermost position with its finger 86 withdrawn from the path of the slugs through the chute.

When the levers occupy the position described, the slugs will be prevented from passing to the flattening press and will bank up in the chute 53. The lever 82 is provided with a rearwardly and outwardly extending portion 90 which is disposed in the path of an upwardly extending trip lever 91. The lever 91 is pivotally mounted for rearward movement upon one of the bearing blocks 73 which are carried by the feed plate 67 of the flattening press. This lever is maintained in a substantially vertical position in engagement with a stop member 92 by means of a coil spring 93. As the feed plate 67 moves rearwardly by means of the mechanism hereinbefore described, the upper end of the trip lever passes over the cam surface 91 of the lever 82 at the proper time and causes this lever to momentarily swing about its pivot 84. This movement of the lever 82 causes the finger 85 thereof to move out of the path of the slugs in the chute 53 and permits the lowermost one to slide downwardly into the slot 71 of the feed plate 67.

As soon as the lever commences to move, as above described, the lever 83 starts its inward movement and the finger 86 thereof enters the chute directly above the lowermost slug and prevents the bank of slugs in the chute from being released with the withdrawal of the finger 86. As soon as, however, the trip lever 92 passes over the cam surface 91 of the lever 82 this lever will be released and will return to its initial position under the action of the spring 89. When the feed plate 67 starts to move forwardly to position the slugs delivered thereto in position beneath the plunger 59, the trip lever 92 will engage the relatively broad end of the extension 90 of the lever 82 and will swing about its pivotal connection against the action of the coil spring 93 and pass beneath the lever 82 without imparting movement thereto. If it should transpire that, from any cause, a slug becomes lodged between the end of either of the inwardly projecting fingers 85 or 86 of the levers 82 and 83 and the side wall of the chute 53, the resilient connection 88 between the several levers will prevent any damage to the fingers as would be the case if these elements had a positive connection.

The finishing machine F, in the present instance, is shown as constituting a punching and trimming press which comprises in general, a base portion 94, a frame 95, guides 96 provided on the frame, a reciprocable plunger 97, a power shaft 98, an eccentric 99 carried by the power shaft and the pitman 100 which connects the eccentric 99 with the plunger 97. A bed plate 101 is carried by the base portion 94 of the press and supports a lower die member 102. The plunger 97 is provided with an upper die element 103 which cooperates with the lower die member 102 in punching a central hole in the flattened blanks $b$ and in trimming the outer peripheries thereof. The lower end of the chute 81 terminates at a point slightly above the lower die member 102 and out of the path of the reciprocating upper die 103.

In order that the flattened blanks $b$ will be properly centered on the lower die 102 as to be properly punched and trimmed, there is provided a ring 104 which surrounds the lower die member 102 at a point below the upper face thereof. A plurality of upwardly projecting spring fingers 105, preferably three in number, are secured to this ring and curve upwardly and inwardly toward the face of the lower die 102. The upper ends of these fingers are inclined outwardly and are adapted to be engaged by the blanks as they emerge from the chute 81. Inasmuch as the fingers 105 each exert substantially the same amount of tension on a blank that they intercept, the blank will be automatically centered with respect to the cooperating die elements 102 and 103. As the upper die 103 descends it will first engage the outwardly bent upper portions of the fingers 105 and force these fingers radially apart and out of the path of the die.

A depending bracket 106 is fixed to one of the guide members 95 of the upper plunger 96 and carries at its lower end a resilient arm 107. This arm has a tendency to project in a radial direction towards the axis of the die members and in turn carries a relatively short channel or chute 108. When the upper die descends it engages the chute 108 and forces it out of its path of movement as indicated by the dotted lines in Fig. 8. As soon as the upper die rises the action of the spring arm 107 is such as to automatically lift the chute 108 beneath the die to receive and eject a finished article from the machine (Fig. 8) as it is dislodged from the upper die member 103 by means of the usual knock out rods, not shown.

In order that the delivery of the flattened blanks b to the punching and trimming press F from the initial or flattening press E will be timed properly with respect to the reciprocation of the upper die 103, a suitable control device, indicated as a whole at 109, is provided in the path of the flattened blanks down the chute 81. This control device operates in substantially the same manner as does that which controls the delivery of the punchings a to the initial forming press E and comprises a pair of spring fingers 110 and 111 which are mounted on the opposite walls of the chute 81. The extremities of the fingers 110 and 111 are respectively provided with inwardly extending portions 112 and 113 which are adapted to alternately project through apertures in the side flanges of the chute 81.

The construction of the fingers 110 and 111 is such that when they occupy a normal position the portion 112 of the finger 110 projects through its aperture and into the path of the fingers down the chute with a portion 113 of the finger 111 withdrawn from such position. The fingers are connected to move yieldably in unison by means of a yoke member 114.

The finger 110 is provided with a cam surface 115 which is disposed in the path of movement of a depending rod 116 which is secured to the plunger 97 of the press. When the plunger 97 commences its downward movement the lower extremity of the rod 116 engages the cam surface 115 and forces the finger 110 in a lateral direction to withdraw the portion 112 through its aperture in the side wall of the chute 81 and release a flattened blank detained thereby for delivery to the lower die member 102. As the finger 110 is actuated, as above described, the connecting yoke member 114 effects a simultaneous inward movement of the blank 111 and causes a portion 113 carried thereby to enter the chute 81 above the lowermost blank to arrest the passage of the remaining slugs theredown. Upon the upward movement of the plunger 97 the rod 116 becomes disengaged from the cam surface 115 and the fingers 110 and 111 return to their normal position to permit another blank to descend until arrested by the portion 112 of the finger 110.

The foregoing description applies particularly to the manufacture of washers from metal punchings, but if it is desired to produce nut blanks, either of hexagonal or circular configuration, it is only necessary to change the dies in the press F and to dispense with the operation performed by the flattening press E such as either by discontinuing its operation or by entirely removing it, as some punchings to be acted upon are initially of proper thickness and do not require the preliminary flattening operation but only need to be punched and trimmed.

Figure 17:
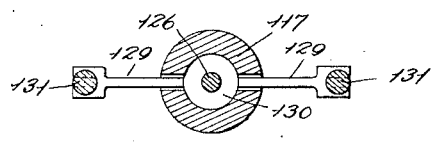
Fig. 17 is a horizontal sectional view taken on line 17—17 of Fig. 16.

In Figs. 16 to 20 inclusive the punching and trimming press F is shown as being equipped with dies suitable for the manufacture of hexagonal nut blanks. The upper female die member 117, in this embodiment of the invention, is threaded into the plunger 97, as indicated at 118, and is provided with a hexagonal opening 119 in its lower portion for cooperation with a similarly shaped lower male die member 120 which is carried by the bed plate 101. The die member 117 is further provided with an axial bore 121 and is diametrically slotted as indicated at 122. A block or ejector 123, having the same configuration as the opening 119, is slidably mounted within this opening and is provided with a concave lower face 124. The block 123 is preferably formed with a head or flange portion 125 which is slidably disposed within the bore 121 and which prevents the displacement of the block from the opening 119.

The die 117 is equipped with a punch 126 for the purpose of forming a central hole in a punching at substantially the same time that it is trimmed. This punch is provided with an enlargment or head 127 at its upper end for a threaded engagement with the die 117 and extends axially through the bore 121 and through an opening 128 provided with the block 123. The lower extremity of the punch 126 terminates flush with the lower face of the block 123 and is preferably slightly concave to conform with the curvature of the lower face 124 of this block.

The block 123 is reciprocated independently of the die 117 and the punch 126 carried thereby, by means of a cross bar 129 which extends transversely through the slotted portion 122 of the die 117 and which is provided with an apertured enlargement 130 intermediate of its ends through which is provided with an aperture enlargement 130 is adapted to slide freely within the bore 121 and may or may not be an integral portion of the block 123. The extremities of the cross bar 129 are suitably connected with rods 131 which extend vertically through openings 132 in the plunger 97, and which are slidably supported, adjacent to their upper ends, in brackets 133 carried by the frame structure 95 of the press. The upper extremities of the rods 131 are yieldably maintained in engagement with cams 134 carried by the main power shaft 98 of the press, by means of impression springs 135 which are interposed between the bracket members 133 and collars 136 fixed to the rods 132.

The cams 134 are so shaped that they act concurrently with the eccentric 99 during a part of their movement to cause the block 123 to descend, through the medium of the rods 131 and cross bar 129, simultaneously with the die member 117 until the concave face 124 of the block 123 engages the upper or convexed face of a punching. At this point there is a dwell in the action of the cams and the block 123 ceases its downward movement but is maintained in tight engagement with the punching to hold it firmly during the following punching and trimming operations. The die member 117 and the punch 126 carried thereby, however, continue their downward travel until the punching is punched and trimmed to the configuration of a nut blank. The die member 117 and the punch 126 then commence their upward travel and the block 123, being still held in engagement with the nut blank, functions as a knock out element to strip the blank from the die and the punch. As soon, however, as the lower faces of the die and the punch becomes flush with the face of the block 123 and the nut blank is freed from the forming elements, the cams 134 release the rods 121 and they together with the cross bar 129 and block 123 raise along with the die and punch under the action of the springs 135.

The above described die structure operates equally well upon punchings that are relatively thick, such as those derived from heavy plates. If relatively thick punchings are to be formed into nut blanks, it will be readily appreciated that such punchings must be first reduced to a thickness that is properly proportionate to their diameter, as theoretically it would be impossible to punch a hole of the desired diameter in a punching that is as thick or thicker than the diameter of the punching, without fracturing the walls of the nut blank.

When thick punchings are introduced to the machine the block 123 descending simultaneously with the die 117 will first flatten and spread the metal of the punching until the downward movement of the block ceases, by which time the punching has been reduced to the thickness of a finished nut blank. The continued downward movement of the die 117 trims off the excess metal in the form of segments with a minimum of waste, the greatest diameter of a finished nut blank being substantially equal to that of the punching from which it is formed, in the event that the punching is originally of such dimensions as to require no reduction in thickness.

It will be understood, however, that the cams 134 are so proportioned and positioned with respect to the eccentric 99 that the block 123 will discontinue its descent at a distance from the lower die 120 that is equal to the thickness of a standard nut blank, and that when punchings of such thickness are operated upon they are merely gripped between the block 123 and the lower die element without being reduced in thickness and the block gives no crown-forming pressure on the slugger blank.

The concaved face 124 of the block 123 may be of a curvature substantially equal to that of the convex face of a punching and tends to preserve the configuration of this face to provide a rounded or chamfered top to the finished nut blank.

By means of the above described process of making nut blanks from metal punchings, the natural convex surface of a punching is or may be utilized to provide a chamfered top to a nut without a swedging operation, and consequently this process tends to reduce the power required to produce nut blanks and the amount of work to be performed by the die elements. Furthermore, by presenting the convex surface of a punching to the trimming die and punch the inherent action of these elements is such as to augment or increase the curvature of the convex surface of the nut blank for the reason that the cutting edges of the die and punch have the tendency to depress the surface of the metal adjacent thereto, and the pressure of the cutting elements alone, that is to say of the female die and punch or piercer, will sufficiently crown the nut blank when the metal is heated and softened as described, although the metal be preliminarily flattened, and relieves the machine of a heavy strain by doing away with a pressing and crowning element. The principal function of the block 123 is to eject the cut blank from within the female die.

While there has been illustrated and described a machine for forming washers and nut blanks from metal punchings, it will be readily apparent that by merely changing the several dies in the different presses, the process as well as the improved heating and feeding means may be employed for the production of other small metal articles.

As to many features of my invention the word "slug" has a broad significance, being used to describe pieces of metal of any shape suitable for the purpose.

I have operated the machine successfully when the slugs or other metal were heated to temperatures of from 1500 to 1800 degrees F. Higher or lower temperatures may also be used, the objects being to have the slugs soft enough to work easily for the formation of perfect blanks, and on the other hand not to subject the dies or other parts to an unnecessarily high degree of heat, and as to these matters the judgment of the operator may be exercised.

Many of the slugs which are to be formed into nut blanks have more or less depending fins around their lower edges which present some obstacle to the accurate feeding operation, usually at the instant when the slugs are being fed to a centered position over the lower cutting die. It is, therefore, best to remove from the slugs such fins as would prevent the desired feeding, and this is done by the flattening operation which is effected by the element 59. It will be seen that both the flattening and cutting are performed by the aid of the same heating and softening of the slug. The flattened slugs may be fed with great smoothness, rapidity and accuracy. This flattening element and operation is, therefore, of considerable importance in my mechanism but said flattening element may be thrown out of operation when the slugs are without materially projecting fins and are of such uniform thickness and diameter suitable for the size of nuts to be produced.

It will be understood that material parts of my invention may be availed of if the selective automatic feed from the hopper be dispensed with and the slugs placed by hand on the external end of the conveyor before it enters the heating furnace.

What I claim is—

1. In a machine of the class described, the combination of a heating element, a forming press associated therewith, a chain for conveying metal slugs through said heating element, a chute disposed at the receiving end of said chain, a hopper for holding a supply of slugs, a wheel having a plurality of fingers disposed about the periphery thereof and arranged to successively extract said slugs from said hopper and to deliver them to said chute, a second chute disposed at the delivery end of said conveyor chain and adapted to collect the slugs delivered from said chain and to convey them to said forming press under the action of gravity and an escapement mechanism associated with said last mentioned chute and adapted to regulate the passage of said slugs therethrough with respect to the operation of said press.

2. In a machine of the class described, the combination of a furnace, an initial forming press, and a finishing press associated therewith, a chain for conveying metal slugs through said furnace, a chute disposed at the receiving end of said chain, a hopper adapted to contain a supply of slugs, a rotatable carrier adapted to transfer slugs from said hopper to said chute, means associated with said carrier for displacing improperly positioned slugs therefrom, means associated with said chute for ejecting a surplus quantity and improperly positioned slugs from the machine, a second chute located at the delivery end of said conveyor chain for transferring the slugs from the chain to said initial forming press, means associated with said initial forming press for feeding the slugs thereto in centered position and timed relation with respect to the operation thereof, a third chute for transferring the transformed slugs from the initial forming press to the finishing press, and means associated with said finishing press for centering said slugs therein and timing their delivery thereto with respect to the operation thereof.

3. In a machine of the class described, the combination of a furnace, a forming press associated therewith, a hopper adapted to contain a supply of slugs, and means for transferring said slugs from said hopper to said furnace, said means including a rotatable wheel provided with a plurality of relatively short and relatively long fingers on the periphery thereof adapted to enter said hopper, the short fingers being adapted to successively extract said slugs from said hopper and the long fingers being adapted to agitate the supply of slugs contained therein.

4. In a machine for making nut blanks from punched slugs the combination of means for heating and softening said slugs, means for leveling the bottom of and removing projecting fins from the lower parts of said slugs, dies for cutting said slugs to produce nut blanks, and means for automatically passing the slugs to the heating means and to the fin-removing means and positioning said slugs between said dies, said leveling and removing means being arranged between the heating means and the dies.

5. In a machine for making nut blanks from punched slugs the combination of means for heating and softening said slugs, means for removing projecting fins from the lower parts of said slugs, dies for cutting said slugs and removing a continuous peripheral part and a central punching to produce nut blanks, and means for positioning said slugs between said dies, said removing means being arranged between the heating means and the dies.

6. In a machine for making nut blanks from punched slugs, the combination of means for removing projecting fins from the lower parts of said slugs so that they may slide evenly on their bottom surfaces, dies for cutting said slugs to produce nut blanks, means for feeding and sliding the slugs individually to a centered position between said dies, and power mechanism operating said dies and said sliding means in timed relation, said removing means being arranged between the heating means and the dies.

7. In a machine for making nut blanks from punched slugs, the combination of a furnace for heating and softening said slugs, means for flattening the bottom surfaces of said slugs, dies for cutting said slugs to produce nut blanks, feeding devices for advancing said slugs successively through said furnace and to said flattening means and thence to a centered position between said dies, and power mechanism operating said flattening means and dies and feeding devices in timed relation, said flattening means being arranged between the heating means and the dies.

8. In a machine for making nut blanks from punched slugs, the combination of a furnace for heating and softening said slugs, a conveyer proof against said softening heat and having a part thereof in said furnace and adapted to carry said slugs, means for flattening said heated slugs, means for transferring the heated slugs to said flattening means, dies for cutting said slugs to produce nut blanks, and means for transferring said slugs from the flattening means to said dies, said flattening means being arranged between said furnace and said dies.

9. In a machine for making nut blanks from punched slugs, the combination of a furnace for heating and softening said slugs, a conveyer proof against said softening heat and having a part thereof in said furnace and adapted to carry said slugs, means for flattening said heated slugs, means for transferring the heated slugs to said flattening means, dies for cutting said slugs to produce nut blanks, and means including a chute and cut-off devices for transferring said slugs one by one from the flattening means to said dies, said flattening means being arranged between the furnace and said dies.

10. In a machine for making nut blanks from punched slugs, the combination of a furnace for heating and softening said slugs, a conveyer proof against said softening heat and having a part thereof in said furnace and adapted to carry said slugs, means for flattening said heated slugs, means for transferring the heated slugs to said flattening means, dies for cutting said slugs to produce nut blanks, means for transferring said slugs from the flattening means to said dies, and means for arranging the slugs processionally on said conveyer, said flattening means being arranged between the furnace and said dies.

11. In a machine for making nut blanks from punched slugs, the combination of a furnace for heating and softening said slugs, an endless conveyer arranged in said furnace, said conveyer being proof against the metal-softening heat, and means for flattening said slug, a male and female die for cutting nuts and the like from said slugs when heated, means for delivering the heated slugs successively from said conveyer to said flattening means and thence to said dies, and a hopper from which the slugs are fed to said conveyer, said hopper having means for automatically arranging a succession of said slugs on their bottom surfaces on said conveyer, said flattening means being arranged between the furnace and said dies.

12. In a machine for making nut blanks from punched slugs, the combination of a furnace for heating and softening said slugs, an endless conveyer arranged in said furnace, said conveyer being proof against the metal-softening heat, a male and female die for cutting nuts and the like from said slugs when heated, means for delivering the heated slugs successively from said conveyer to said dies, and a hopper from which the slugs are fed to said conveyer, said hopper having a wheel and selecting means for automatically arranging a succession of said slugs on their bottom surfaces on said conveyer.

13. In a machine for making nut blanks and the like from punched slugs, the combination of a furnace for heating and softening said slugs, an endless conveyer arranged in said furnace, said conveyer being proof against the metal-softening heat and adapted to carry said slugs resting on their flat bottom faces and exposed to heat on all sides, dies for cutting nut blanks and the like from said slugs when heated, and means for causing the heated slugs to slide on their bottom faces successively and individually from said conveyer to a cutting position between said dies.

14. In a machine for making nut blanks and the like from punched slugs, the combination of a furnace for heating said slugs, a conveyer movable in said furnace adapted to carry said slugs resting on their flat bottom faces and exposed to heat on all sides, dies for cutting the exterior and interior of said heated slugs, and means for causing said slugs to slide on their bottom faces from said conveyer into cutting position relative to said dies.

15. In a machine for making nut blanks from punched slugs, the combination of a furnace for heating and softening said slugs, means for flattening the bottom surfaces of said slugs, dies for cutting said slugs to produce nut blanks, feeding devices for advancing said slugs while resting on their flat bottoms successively through said furnace and to said flattening means and thence to a centered position between said dies, and power mechanism operating said flattening means and dies and feeding devices in timed relation, said flattening means being arranged between the furnace and said dies.

16. In a machine for making nut blanks from punched slugs, the combination of a slug-heating furnace, means for removing projecting fins from the lower parts of said slugs so that they may slide evenly on their bottom surfaces, a male and female die for cutting said slugs to produce nut blanks, means for feeding and sliding the slugs individually to a centered position between said dies, devices for delivering the slugs one by one to said feeding and sliding means, and power mechanism operating said dies and said sliding means and said delivering devices in timed relation.

17. In a machine of the class described, the combination of a heating element, an initial slug-flattening press associated therewith, means for subjecting metal slugs to the heating action of said element, means for transferring said slugs from said heating element to said initial flattening press, a final blank-cutting press, and means for transferring the partially transformed slugs thereto from the initial flattening press, said flattening press being arranged between the heating elements and the blank-cutting press.

18. In a machine of the class described, the combination of a heating element, an initial slug-flattening press associated therewith, means for subjecting metal slugs to the heating action of said element, means for transferring said slugs from said heating element to said initial flattening press, a final blank cutting press, means for transferring the partially transformed slugs thereto from the initial flattening press, and means for regulating the delivery of said slugs one by one to said final cutting press with respect to the operation thereof, said flattening press being arranged between the heating elements and the blank-cutting press.

19. In a machine of the class described, the combination of a heating element, an initial slug-flattening press associated therewith, means for subjecting metal slugs to the heating action of said element, means for transferring said slugs from said heating element to said flattening press, a final blank cutting press, means for transferring the partially transformed slugs thereto from the initial flattening press, and means for centering said slugs in said final cutting press, said flattening press being arranged between the heating elements and the blank-cutting press.

20. In a machine of the class described, the combination of a heating element, an initial slug-flattening press associated therewith, means for subjecting metal slugs to the heating action of said element, means for transferring said slugs from said heating element to said flattening press, a final cutting press having upper and lower dies, means for transferring the partially transformed slugs thereto from the said flattening press, and a yieldably mounted member adapted to move into the path of the upper die of said press when said die is in a raised position to deflect the finished blank from said press as it falls from the upper die and to be engaged and automatically moved out of the path of the upper die when the latter descends.

21. In a machine of the class described, the combination of a furnace, a forming press associated therewith, a hopper adapted to contain a supply of slugs, and means for transferring said slugs from said hopper to said furnace, said means including a rotatable wheel provided with a plurality of fingers on the periphery thereof adapted to enter said hopper and to successively extract said slugs therefrom, and a fixed convex bar on which said fingers cause the slugs to slide when they rest on their bottom faces.

In testimony whereof I affix my signature.

JOHN F. GOLDING.